(12) United States Patent
D'Agostini et al.

(10) Patent No.: US 8,578,892 B2
(45) Date of Patent: Nov. 12, 2013

(54) OXYGEN CONTROL SYSTEM FOR OXYGEN ENHANCED COMBUSTION OF SOLID FUELS

(75) Inventors: Mark Daniel D'Agostini, Ebensburg, PA (US); Jeffrey William Kloosterman, Allentown, PA (US); Kevin Boyle Fogash, Wescosville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1100 days.

(21) Appl. No.: 12/138,755

(22) Filed: Jun. 13, 2008

(65) Prior Publication Data

US 2009/0308331 A1 Dec. 17, 2009

(51) Int. Cl.
F23C 10/00 (2006.01)

(52) U.S. Cl.
USPC .................. 122/4 D; 432/37; 431/10

(58) Field of Classification Search
USPC ........... 122/4 D; 432/19, 20, 24, 37; 110/215, 110/229, 230, 345, 348, 261; 431/10, 11
See application file for complete search history.

(56) References Cited

U.S. PATENT DOCUMENTS

| | | | |
|---|---|---|---|
| 3,689,773 A * | 9/1972 | Wheeler | 250/554 |
| RE33,464 E * | 11/1990 | Gitman | 432/13 |
| 6,277,268 B1 | 8/2001 | Khesin et al. | |
| 6,389,330 B1 | 5/2002 | Khesin | |
| 6,775,645 B2 | 8/2004 | Daw et al. | |
| 6,901,351 B2 * | 5/2005 | Daw et al. | 702/188 |
| 7,185,595 B2 | 3/2007 | D'Agostini et al. | |
| 7,197,880 B2 | 4/2007 | Thornton et al. | |
| 7,838,297 B2 * | 11/2010 | Widmer et al. | 436/55 |
| 7,913,632 B2 * | 3/2011 | Jia et al. | 110/347 |
| 2003/0093246 A1 * | 5/2003 | Daw et al. | 702/188 |
| 2004/0191914 A1 | 9/2004 | Widmer et al. | |
| 2004/0231332 A1 | 11/2004 | Saucedo et al. | |
| 2005/0019715 A1 | 1/2005 | D'Agostini et al. | |
| 2005/0058958 A1 | 3/2005 | Kobayashi et al. | |
| 2006/0116515 A1 | 6/2006 | Gahman et al. | |
| 2008/0264310 A1 * | 10/2008 | Jia et al. | 110/186 |
| 2009/0311642 A1 | 12/2009 | Kloosterman et al. | |

FOREIGN PATENT DOCUMENTS

WO 2006116515 11/2006

OTHER PUBLICATIONS

Kevin Boyle Fogash, Combustion System With Steam or Water Injection, U.S. Appl. No. 12/238,632, filed Sep. 26, 2008.
Aleksandar Georgi Slavejkov, Combustion System With Precombustor, U.S. Appl. No. 12/238,644, filed Sep. 26, 2008.

(Continued)

*Primary Examiner* — Gregory A Wilson
(74) *Attorney, Agent, or Firm* — Michael K. Boyer

(57) ABSTRACT

A combustion system and method for operating a combustion system, such as a furnace or boiler. The method includes providing a burner system having one or more burner elements configured to combust solid fuel and one or more oxygen providing devices configured to introduce oxygen into the near burner zone of one or more burner flames. A sensor is provided and arranged and disposed to measure a flame parameter in the near burner zone of the burner flame associated with one or more the burner elements. The flame parameter is measured with the sensor and an oxygen flow is determined in response to the measured flame parameter. Oxygen flow is introduced to one or more locations in the combustion system with the one or more oxygen providing devices.

23 Claims, 6 Drawing Sheets

(56) References Cited

OTHER PUBLICATIONS

Mark Daniel D'Agostini, Oxy/Fuel Combustion System With Minimized Flue Gas Recirculation, U.S. Appl. No. 12/238,657, filed Sep. 26, 2008.

Reed Jacob Hendershot, Convective Section Combustion, U.S. Appl. No. 12/238,671, filed Sep. 26, 2008.

Reed Jacob Hendershot, Oxy/Fuel Combustion System Having Combined Convective Section and Radiant Section, U.S. Appl. No. 12/238,695, filed Sep. 26, 2008.

Mark Daniel D'Agostini, Process Temperature Control in Oxy/Fuel Combustion System, U.S. Appl. No. 12/238,731, filed Sep. 26, 2008.

Mark Daniel D'Agostini, Oxy/Fuel Combustion System With Little or No Excess Oxygen, U.S. Appl. No. 12/238,612, filed Sep. 26, 2008.

Jeffrey William Kloosterman, Transient Operation of Oxy/Fuel Combustion System, U.S. Appl. No. 12/238,713, filed Sep. 26, 2008.

Mark Daniel D'Agostini, Combustion System With Precombustor, U.S. Appl. No. 61/100,372, filed Sep. 26, 2008.

Mark Daniel D'Agostini, Combustion System With Precombustor for Recycled Flue Gas, U.S. Appl. No. 12/566,819, filed Sep. 25, 2009.

* cited by examiner

OXYGEN CONTROL SYSTEM FOR OXYGEN ENHANCED COMBUSTION OF SOLID FUELS

BACKGROUND OF THE INVENTION

The present disclosure is directed to combustion systems that utilize solid fuel burners. In particular, the present disclosure is directed to boiler and furnace systems that utilize oxygen injection to enrich combustion.

While systems which comprise the combustion of low volatile pulverized solid fuel are generally known, many such systems suffer from the drawback that expensive support fuel is typically required to maintain combustion stability. One approach to solving this drawback is to introduce an oxidant whose oxygen concentration is substantially greater than that found in air (~21% by volume).

In such "oxygen-enriched" solid fuel applications, particularly those involving low volatile fuels, burner flame stability is strongly dependent upon having the correct minimum amount of oxygen introduced into the Near Burner Zone (NBZ) of the flame. Managing this process is difficult and complex for multiple burner systems. One approach has been to introduce a comfortable excess of burner oxygen above the minimum requirement. An excess amount of oxygen in the burner system suffers from the drawbacks that the operational costs are higher and additional $NO_x$ is produced.

Known air-fuel combustion control systems generally infer conditions within the combustion zone by monitoring properties of the combustion product gas stream at one or more locations downstream of the individual flames. However, such known systems are not capable of providing a reliable link between downstream gas conditions and local conditions at a particular burner. Hence, such systems are generally not suitable for individually controlling and/or optimizing combustion at each of the individual burners to reduce undesirable emissions and maintain combustion stability.

Other so-called air-fuel burner management systems monitor radiant emissions of the individual flames for the purpose of detecting a "loss-of-flame" condition. When such a condition is detected, the control system response is to terminate fuel flow to the faulty burner and, in direct-fired systems, other burners supplied by the same pulverizer. Systems of this type are not suitable for converting a measured property into an incremental control action that can continuously adjust combustion conditions pertaining to the burner in question.

The introduction of oxygen into a combustion system, while potentially affording numerous performance and emissions benefits, also introduces a new set of control system challenges that are beyond the scope of the aforementioned prior art control systems. Moreover, if not adequately controlled, the misappropriation of oxygen flows can lead to serious economic, operability and emissions penalties, offsetting any potential benefits.

What is therefore needed is a method and system of controlling oxygen injection into a solid-fuel fired burner and furnace that links burner oxygen injection rates with local flame properties. What is also needed is a method and system of optimizing the distribution of oxygen injection rates among a plurality of locations within a multi-burner boiler or furnace.

BRIEF SUMMARY OF THE INVENTION

A first aspect of the present disclosure includes a method for operating a combustion system, such as a furnace or boiler. The method includes providing a burner system having one or more burner elements configured to combust solid fuel and one or more oxygen providing devices configured to introduce oxygen into the near burner zone of one or more burner flames. A sensor is provided and arranged and disposed to measure a flame parameter in the near burner zone of the burner flame associated with one or more the burner elements. The flame parameter is measured with the sensor and an oxygen flow is determined in response to the measured flame parameter. Oxygen flow is introduced to one or more locations in the combustion system with the one or more oxygen providing devices.

Another aspect of the present disclosure includes a combustion system having a burner system having one or more burner elements configured to combust solid fuel and one or more oxygen providing devices configured to introduce oxygen into the near burner zone of one or more burner flames. A sensor is arranged and disposed to measure a flame parameter in the near burner zone of the burner flame associated with one or more the burner elements. A controller is in communication with the sensor and the one or more oxygen providing devices. The controller is configured to receive signals from the sensor corresponding to the flame parameter and determine an oxygen flow in response to the flame parameter. The controller further provides the oxygen flow with the one or more oxygen providing devices.

Still another aspect of the present disclosure includes a boiler system having a combustion system. The boiler system includes a combustion chamber configured to receive combustion of a solid fuel. The boiler includes a combustion system having a burner system having one or more burner elements configured to combust solid fuel and one or more oxygen providing devices configured to introduce oxygen into the near burner zone of one or more burner flames. A sensor is arranged and disposed to measure a flame parameter in the near burner zone of the burner flame associated with one or more the burner elements. A controller is in communication with the sensor and the one or more oxygen providing devices. The controller is configured to receive signals from the sensor corresponding to the flame parameter and determine an oxygen flow in response to the flame parameter. The controller further provides the oxygen flow with the one or more oxygen providing devices.

An advantage of the present disclosure includes a real-time, automated control of burner oxygen enrichment for solid fuel combustion systems capable of utilizing a plurality of burners.

Another advantage includes lower process cost and lower emissions of NOx while reducing the risk of flame blowoff, which can lead to a partial or full shutdown of the combustion boiler or furnace.

Further advantages include control of flame properties such as length and luminosity, as well as the ability to attain a desired distribution of heat release within the combustion furnace or boiler.

Other features and advantages of the present invention will be apparent from the following more detailed description of the preferred embodiment, taken in conjunction with the accompanying drawings which illustrate, by way of example, the principles of the invention.

BRIEF DESCRIPTION OF SEVERAL VIEWS OF THE DRAWINGS

Wherever possible, the same reference numbers will be used throughout the drawings to refer to the same or like parts.

DETAILED DESCRIPTION OF THE INVENTION

Certain embodiments of the present disclosure include systems and methods for combusting solid fuel. As used herein, the term "solid fuel" refers to any solid fuel suitable for combustion purposes. For example, the invention may be used with many types of solid fuels, including but not limited to: anthracite, bituminous, sub-bituminous, and lignitic coals; tar; bitumen; petroleum coke; paper mill sludge solids and sewage sludge solids; wood; peat; grass; and combinations and mixtures of all of those fuels. The methods may also include combustion of substantially unaltered low volatile solid fuel exclusive of grinding, pulverizing and/or micronizing of the solid fuel for pneumatic transport. Such solid fuel may include physically and/or chemically unaltered solid fuel products or byproducts from the refinery processes or other sources and may contain less than 20% volatile content (as determined by ASTM D3175). While not so limited, for example, combustion of petroleum coke according to these embodiments may occur within a horizontally fired utility boiler with little (<20%) or no support fuel. In addition, while not so limited, the systems and methods of the present disclosure may be applicable to wall fired, corner fired and turbo furnace arrangements for suspension burning. Furthermore, certain embodiments of the disclosure utilize selective and controlled oxygen enrichment to enhance the combustion process. The oxygen enrichment provides a) greater turndown via increased flame stability, b) lower emissions than mere air firing, c) increased radiant heat transfer within the combustion zone, d) increased boiler thermal efficiency and e) increased boiler fuel-throughput.

In order to provide efficient boiler or furnace operation, it is desirable to facilitate stable combustion. Stable combustion of pulverized fuel is dependent on factors such as the pulverized fuel grind size, porosity, volatile content, burner aerodynamics, combustion chamber temperature and overall stoichiometry. Generally, increasing the fuel volatile content improves flame stability since volatile combustion is a principal source of particle heat up during the initial stages of char (i.e. solid particle) burning. Hence, flames generated from low volatile fuels such as petroleum coke are relatively difficult to stabilize in continuous, suspension-fired combustion systems.

Figure 1:
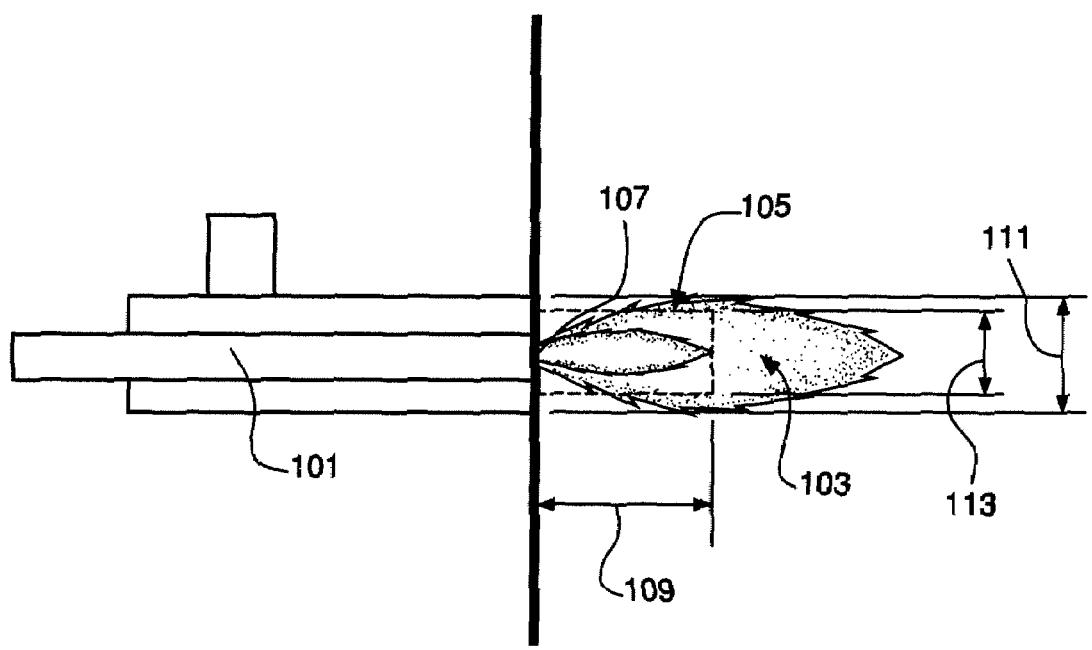
FIG. 1 shows a burner element and flame.

FIG. 1 shows an exemplary burner element 101 during a substantially steady state operation. Burner element 101 is a burner device configured to facilitate combustion of solid fuel. The burner element 101 includes oxygen injection that provides oxygen enrichment suitable to provide an oxygen enriched flame 103. The flame 103 includes a near burner zone (NBZ) 105. The NBZ 105 is a region within flame 103 having a length L and a width d, wherein initial mixing of the majority of the unreacted fuel together with one or more streams of reactant, diluent, transport fluid and/or recirculated flue gas streams takes place. The NBZ 105 may extend from outlet 107 of the burner element 101 a NBZ length dimension (L) 109 constrained by the following:

$L/D_B$ is less than or equal to about 5, preferably less than or equal to about 4, or less than or equal to about 3.

Further, the NBZ width dimension (d) 113 is constrained by the following:

$d/D_B$ is less than or equal to about 2.0, preferably less than or equal to 1.5 or less than or equal to 1.0;

wherein burner effective diameter 111 (i.e., $D_B$) is a burner outlet nozzle diameter.

While not so limited, $D_B$ 111 may be equal to the larger of the following burner geometric parameters:

1) Diameter of the outer burner flow annulus for a circular burner cross-section;
2) Maximum cross-sectional dimension of the outer burner annulus for a non-circular burner;

wherein the burner annulus incorporates any close-coupled injection streams. Although FIG. 1 shows an example of a burner element 101 and flame 103, the illustration is merely exemplary and does not limit the arrangement of the size/geometry of the burner element 101, NBZ 105 or flame 103.

Figure 2:
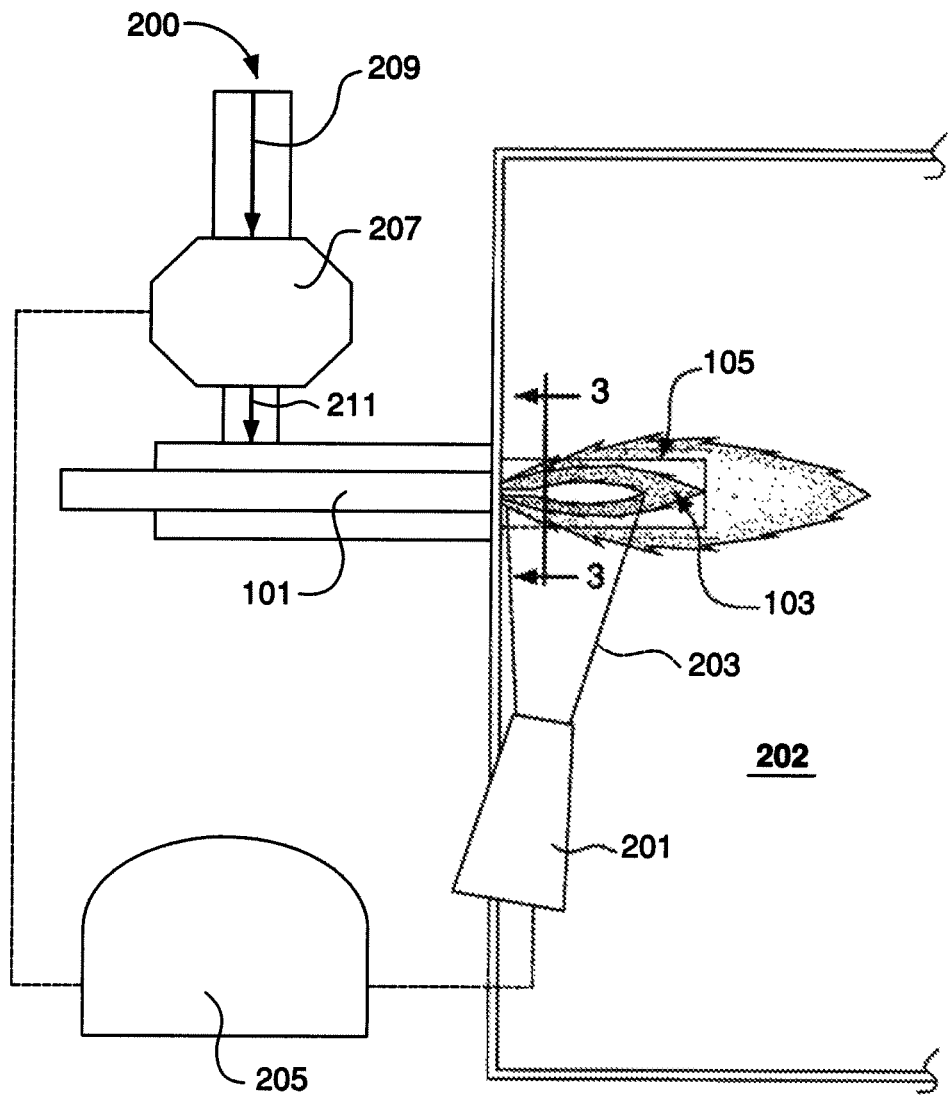
FIG. 2 shows a combustion system according to an embodiment of the present disclosure.

As shown in FIG. 2, the present disclosure includes a combustion system 200 and method for measurement of one or more NBZ flame parameters. The burner element 101 is arranged to provide a flame 103 in a combustion chamber 202. The combustion chamber 202 is a chamber suitable for withstanding combustion conditions and managing and transporting combustion products. The combustion system 200 may be a furnace, boiler or other heating system.

Figure 4:
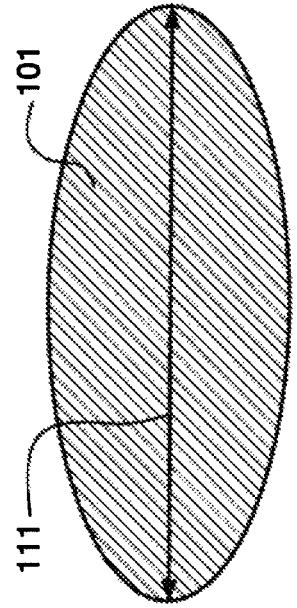
FIG. 4 shows a front view of a burner according to another embodiment of the present disclosure taken along direction 3-3 of FIG. 2.
Figure 6:
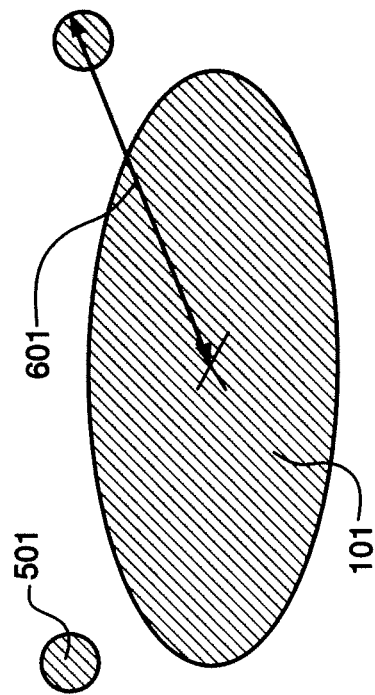
FIG. 6 shows a combustion system according to still another embodiment of the present disclosure.
Figure 3:
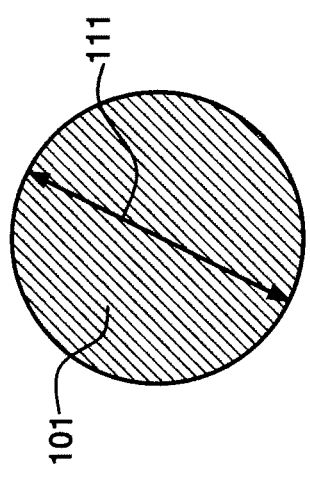
FIG. 3 shows a front view of a burner according to an embodiment of the present disclosure taken along direction 3-3 of FIG. 2.
Figure 5:
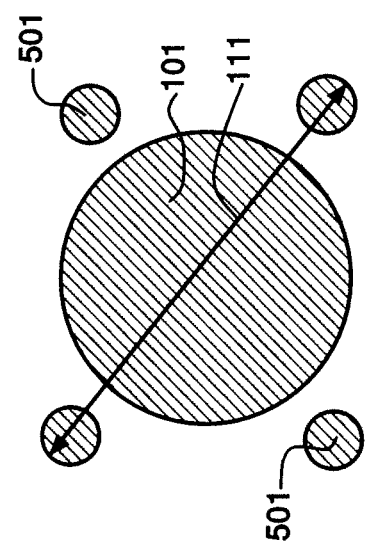
FIG. 5 shows a front view of a burner according to still another embodiment of the present disclosure taken along direction 3-3 of FIG. 2.

FIGS. 3-6 show exemplary alternate front views of embodiments of burner elements 101 according to alternate embodiments of the present disclosures taken in direction 3-3 of FIG. 2. As shown in FIG. 3, one embodiment includes a circular geometry, wherein the $D_B$ 111 is taken as the diameter of the burner element 101. As shown in FIG. 4, one embodiment includes an oval geometry, wherein $D_B$ 111 is taken as the largest cross-sectional dimension of the burner element 101. FIG. 5 shows an alternate embodiment wherein the burner element 101 includes close-coupled reactant conduit openings 501 arranged in close proximity to the burner element 101. The conduit opening 501 provides material, such as, but not limited to, fuel (e.g., coal), oxygen, air, recirculated flue gas, or combinations thereof to alter flame properties, as desired. In the embodiment shown in FIG. 5, $D_B$ 111 is taken as the dimension across the conduit openings and burner element 101. FIG. 6 shows still another embodiment wherein the $D_B$ 111 is twice the burner effective radius ($R_B$) 601 taken across the conduit openings and burner element 101. Specifically, $D_B$ 111 can be calculated according to the following formula:

$$D_B = 2 \times R_B.$$

In order to determine the amount or flow of oxygen required for the desired combustion, a non-obstructive sensing technique utilizing a sensor 201 positioned at a location remote from flame 103 is utilized. "Remote", as used herein, includes a positioning of the device (e.g., sensor 201) in a location that does not interfere with or obstruct the flame 103, while still permitting measurement of one or more flame properties. The sensor 201 may be positioned in any suitable location that permits measurement of one or more of the flame properties within the NBZ 105. As shown in FIG. 2, the sensor 201 may be mounted in the combustion chamber 202 at some distance from flame 105. The present disclosure is not so limited and may include sensor 201 locations that are closer or farther away from the flame 103. In addition, the sensor 201 may be positioned in a location exterior to the combustion chamber 202 provided that the sensor 201 is capable of measuring the flame parameter of the NBZ 105. The use of a sensor 201 remote from flame 103 permits reduced or eliminated interference with the combustion process, and reduced affect of the aggressive combustion environment on the sensor 201.

The flame parameter is measured to determine a flow or concentration of oxygen for injection into a pulverized solid fuel flame and/or into a combustion chamber at other desired locations. The flame parameter is a property of the flame 103 that is measurable and is at least partially dependent upon oxygen concentration present in the combustion process. For example, suitable flame parameters include, but are not limited to, flame temperature, species concentrations, optical and acoustic emissions. Sensor 201 may, for example, include an optical sensor capable of measuring a temperature within the NBZ 105. In another embodiment sensor 201 includes a radiation-type sensor that absorbs radiant energy from the flame 103 in a NBZ 105. Sensor 201 may, for example, include a thermocouple positioned in a location for measuring a temperature within the NBZ 105 without obstructing or interfering with flame 103. The sensor 201 may measure one or more properties of the flame (i.e., flame parameters), such as flame temperature, which is strongly dependent on the local oxygen flow rate. Those skilled in the art will recognize that other flame parameter measurements may also be employed, such as those parameters that detect concentrations of one or more chemical species, for example, CH, OH, NO, CO or other molecules. Acoustic monitors and various remote spectral- and/or laser-based flame sensing systems can also be used to extract the necessary characteristic data from the NBZ 105.

As shown in FIG. 2, the combustion system 200 measures flame parameters, and controls oxygen flow rates to individual burner elements 101. The resultant control achieves a desired distribution of oxygen to a plurality of burners supplying, for example, a solid-fuel fired boiler or furnace. The sensor 201 includes a sensing area 203 corresponding to the NBZ 105. The flame parameter is determined within the sensing region 203 and a signal is transmitted to a controller 205. The controller 205 is a microprocessor or other processing device capable of receiving and analyzing signals from sensor 201. Controller 205 determines an oxygen flow in response to the flame parameter. Although the above has been described with respect to an oxygen flow rate, the present disclosure is not so limited and may include other measures of oxygen amount. For example, the controller 205 and an oxygen providing device 207 may determine and control oxygen concentration or oxygen quantity. In one embodiment, the determination of oxygen flow is accomplished by comparing the measured flame parameter by the sensor 201 to a predetermined set point value. In response, the controller adjusts the oxygen flow rate at the oxygen providing device 207 until the measured and set point values are sufficiently close in magnitude to one another. For example, the controller 205 may send a modulating signal to the oxygen providing device 207. The oxygen providing device 207 is a device capable of providing and controlling oxygen supply 209, wherein the rate of oxygen injection 211 corresponds to injection into the NBZ 105. Suitable oxygen control devices include, for example, flow control valves, pressure regulating valves and flow measuring elements such as orifice plates. Controller 205 determines an oxygen flow in response to the flame parameter.

In embodiments wherein a plurality of burner elements 101 are present in the combustion system 200 (see e.g., FIG. 7), the process is repeated for all burner elements 101 in the system. In multiple burner element combustion systems 200, the oxygen excesses and deficiencies inferred through measurements made by sensor 201 within the NBZ 105 and determined by controller 205 are exchanged and prioritized among the burner elements 101 and/or auxiliary oxygen injection points located remote from the burner element 101 to provide oxygen management and balance to efficiently utilize the oxygen supply 209.

Oxygen injection into a solid fuel flame is useful for, among other things, flame stabilization, modification of flame properties and control of pollutant emissions. Oxygen may also be injected into the burners or into other locations of the combustion system. For example, oxygen may be introduced into the windbox, into the over-fire air, and into the burners (see e.g., FIG. 2). Oxygen introduction into the burner elements 101, can be through any known gas injection arrangement. For example, oxygen may be introduced through a central conduit that can also be used to introduce an additional air stream into the burner element 101. Oxygen, as utilized herein may include high purity oxygen, commercially available oxygen or oxygen-rich streams, containing sufficient oxygen concentration to enhance combustion.

The controller 205 may include predetermined settings that correspond to desired combustion conditions relating to, for example, combustion stability, thermal efficiency or emissions. Such predetermined settings are dependent upon a variety of factors, including the size, type and conditions of the combustion system 200. Such factors may be determined during operation. For example, an increase in NBZ flame temperature with an NBZ 105 oxygen injection rate by burner element 101 increases the rate of release of volatile chemical species, which raises the flame 103 propagation speed. This, in turn, enhances the stability of the flame by bringing the flame front into greater proximity with the burner element 101. Therefore, oxygen injection control resulting from, for example, the NBZ 105 flame temperature parameter provides an operation mode in which flame stability may be obtained or maintained during operation.

Figure 7:
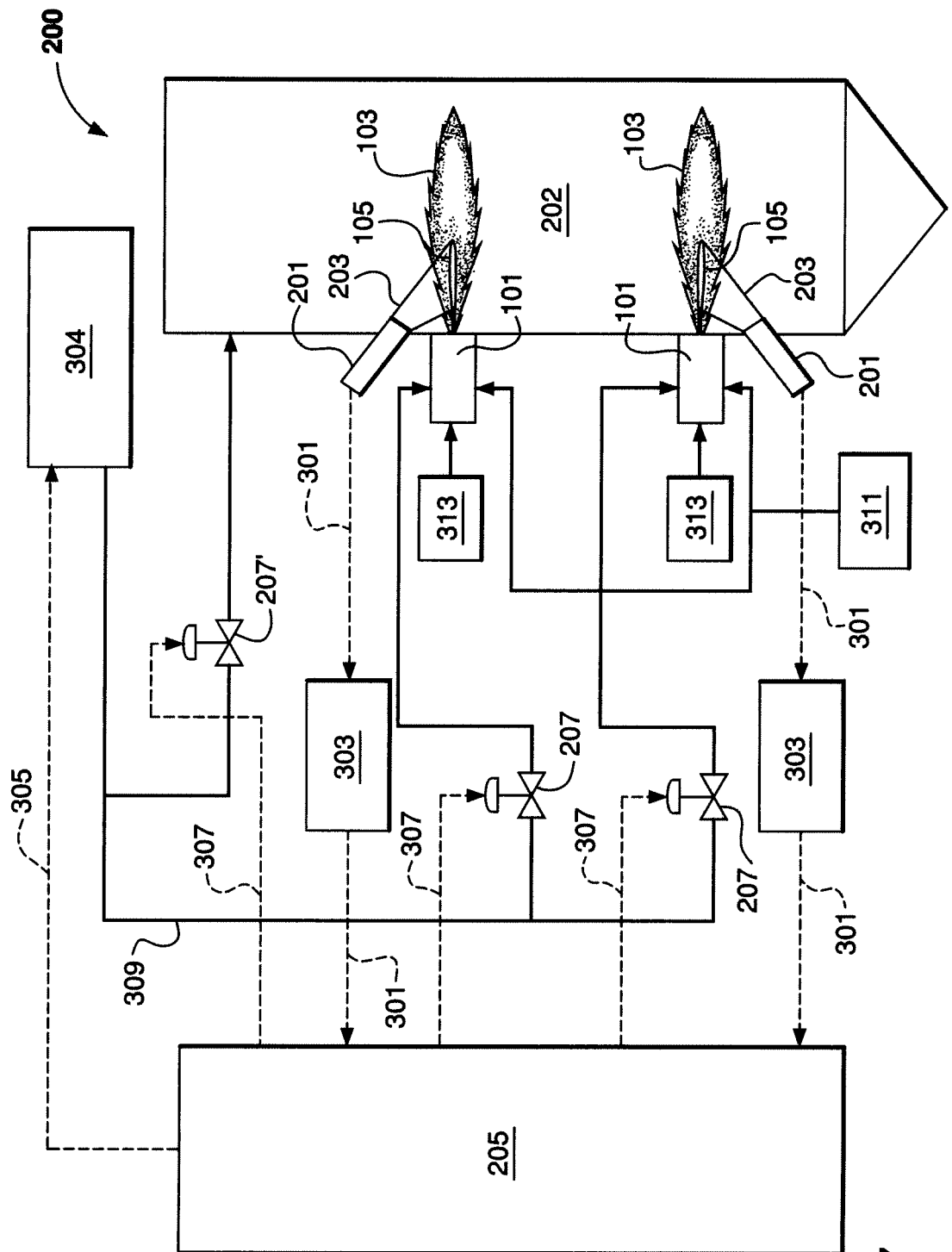
FIG. 7 shows a control system according to an embodiment of the present disclosure.

As shown in FIG. 7, embodiments of the present disclosure include a combustion system 200 including a plurality of burner elements 101. The sensors 201, controllers 205 and oxygen providing devices 207 are arranged to measure flame parameters, control oxygen flow rates to individual burners, and achieve a desired distribution of oxygen to a plurality of burner elements 101 supplying, for example, a solid-fuel fired boiler or furnace. In this embodiment, the combustion system 200 includes a pulverized solid fuel boiler employing a plurality of burner elements 101, each configured to introducing NBZ 105 oxygen enrichment. The combustion system 200 also contains a secondary oxygen providing device 207' outside the burner element 101 and NBZ 105. Each burner element 101 includes a corresponding sensor 201 aligned such that the sensor region 203 is filled partially or fully with the NBZ 105 of the burner flame 103. Flame temperature, or another suitable flame parameter, is determined from sensor 201 and an output is transmitted along sensor lines 301 to a transmitter 303 or similar device to further transmit or relay the signal to the controller 205. Transmissions along sensor lines 301 may also be provided directly to controller 205. In addition, in other embodiments, transmitter 303 may also partially or fully analyze the signal prior to transmission to controller 205.

The controller 205, as discussed above, is a microprocessor or similar device that is capable of analyzing the signals from sensors 201 to determine and/or compare the flame parameter. The controller 205 may also contain and/or store information such as the set points for NBZ flame parameters for each burner element 101, histories of operation and corresponding operational parameters for the combustion system 200 and/or global oxygen flow requirements to the boiler. An oxygen source 304 may comprise a system including cryogenic separation of air to produce oxygen (in various purities) and other by-products (typically, nitrogen and argon). The product oxygen from the oxygen source can be either gaseous or liquid in form. Alternatively, oxygen can be generated via a pressure swing/vacuum swing operation over adsorbent beds. Other processes, such as membrane-based systems, including ion transport membranes, can also produce an oxygen predominant stream. Signals to or from oxygen source 304 may be provided to and from controller 205 via oxygen supply signal line 305 to provide data and control functions for oxygen supply to the combustion system. Oxygen can also be provided from a liquid oxygen tank, or through other production means known in the art. Further, one or more additional fluid streams 311 and solid fuel source 313 are provided to feed burner element 101 and support combustion within combustion chamber 202. As discussed above, the fuel source 313 preferably includes a pulverized low volatile fuel, such as petroleum coke. The one or more additional fluid streams may comprise air, recirculated flue gas, water, nitrogen, and other diluents alone or in combination.

In response to receiving the NBZ process data, the controller 205 compares the measured flame parameter to the predetermined set point, calculation or other value for each burner element 101 and delivers a control signal via control line 307 to each oxygen providing device 207. The oxygen providing device 207 permits or prevents flow of oxygen from the oxygen source 304 via oxygen supply line 309. In addition, the controller 205 may identify a flow requirement for oxygen providing device 207', which is configured to deliver additional flow of oxygen from oxygen source 304 via oxygen supply line 309, to a location inside the boiler or furnace that is outside or away from the NBZ 105. A feedback loop may be continued, for example, until the difference between each flame parameter and predetermined value within controller 205 is sufficiently minimized. In addition, the process is completed individually with all of the burner elements 101.

In another embodiment, the flame parameter and oxygen supply control process will result in a situation where the instantaneous cumulative demand for oxygen to the NBZ of all burners is less than the total supply of oxygen to the boiler from oxygen source 304. The method of the present disclosure includes discharging the instantaneous excess oxygen flow into the secondary oxygen line at oxygen providing device 207' and/or providing a signal via oxygen supply signal line 305 to the oxygen source 304 to reduce the total flow delivered to the combustion system 200.

In another embodiment, the flame parameter and oxygen control process will result in a situation where the instantaneous cumulative demand for oxygen to the NBZ of all burners is greater than the total oxygen supply to the boiler. The method of the present disclosure includes redirecting oxygen from the secondary oxygen line via oxygen providing device 207' to the deficient burner element or elements 101 and/or providing a signal via oxygen supply signal line 305 to the oxygen source 304 to increase the total flow delivered to the combustion system 200. In general, when multiple burners are employed, the controller 205 can integrate signals from all burner elements 101 and optimize the distribution of oxygen flows accordingly.

In another embodiment, it is desirable that the flow of oxygen through oxygen providing device 207' is zero. The method of the present disclosure includes maintaining this zero flow condition regardless of oxygen flow demand to the burner NBZ.

An optional feature of the system is a secondary oxygen injection point capable of delivering oxygen into the furnace or boiler substantially away from the NBZ 105, and a controller 205 capable of utilizing both the secondary injection point and/or the main oxygen supply as means of balancing, prioritizing and optimizing overall system oxygen flow distribution.

The benefits of an automated control system that can be inferred from data presented herein include, but are not limited to, enhanced combustion stability, reduced $NO_x$ emissions, improved combustion efficiency and minimization of oxygen usage.

Example

A wall-fired solid fuel combustion system was operated with two industrial-design swirl-type burners burning pulverized petroleum coke with air and oxygen, and a flame temperature was monitored for one of the burners using an infrared pyrometer. The pyrometer was a thermo-imaging Mikron M9104 pyrometer available from Mikron Infrared, Inc. Oakland, N.J. The measurements were taken during two different modes of oxygen enrichment. In a first mode, oxygen was injected directly into the NBZ. In the second mode, oxygen was distributed uniformly over the entire flame length. The solid petroleum coke fuel properties were as follows:

Higher Heating Value: 14,000 Btu/lb
Fixed Carbon Content: 80 wt %
Volatile Content: 10 wt %
Particle Size: 80 wt % passing through US 200 mesh screen The flame 103 length was nominally 10 times the burner outlet nozzle diameter. Flame temperature data for the operational modes were recorded. The normalized sensitivity of flame temperature to oxygen flow obtained at full load operating conditions, as summarized in Table 1, indicate the oxygen injection into the NBZ 105 has an effect on NBZ temperature which is nominally three times as large (in degrees Fahrenheit per unit O2 flow) as the magnitude resulting from distributed oxygen injection. The linear correlation coefficient, R, for the data set with NBZ oxygen injection was also significantly higher than the corresponding value for the distributed oxygen injection case. The linear correlation coefficient is a commonly used indicator of the precision of a correlation. The definition of this parameter can be found in most elementary books on statistics or data regression (for example, Experimental Methods for Engineers, $5^{th}$ Edition, by J. P. Holman, McGraw-Hill Book Company, New York, 1989). A perfect correlation, i.e. one with no random deviation or scatter, has an R value equal to 1.0. A deficit in the R value beneath 1.0 is thus a measure of the imprecision or relative random error, of the correlation. The data of Table 1 thus indicate a level of random error associated with the NBZ oxygen injection data set that is nominally ⅓ the value associated with the distributed oxygen injection set. This implies a highly repeatable and reliable cause vs effect relationship between NBZ oxygen and temperature that is suitable for continuous feedback control.

TABLE 1

| O2 Injection Mode | Normalized Ratio of NBZ Temperature Increase to O2 Injection Rate (degrees F. per unit O2 flow) | Linear Correlation Coefficient, R |
|---|---|---|
| NBZ | 3.0 | .965 |
| Distributed Over Flame | 1.0 | .900 |

For this example, flame stability was also measured and recorded during these tests. Stability for this data set was defined and determined by the steadiness and positioning of the flame front (location where visible ignition first occurs). Stable flames, as defined herein, had flame fronts that were essentially "attached" to the burner nozzle. That is, there was very little distance between the exit plane of the burner nozzle and the start of the flame front. Moreover, the position of the flame front of a stable flame did not vary substantially over time. By contrast, the position of the flame front of a quasi-stable or unstable flame was generally "detached" from the burner nozzle. That is, there was considerable distance (e.g., several feet) separating the burner nozzle exit plane and the flame front. Additionally, the position of the flame front of an unstable or quasi-stable flame was prone to move considerably over time in relation to the burner nozzle exit plane, and was susceptible to being extinguished by process perturbations. Table 2 shows data indicating the frequency of occurrence (number of occurrences divided by total number of tests) of stable and unstable petroleum coke flames as a function of average NBZ temperature for 55 test points. As Table 2 shows, there is a sharp break in frequency of stable and unstable flames in the average NBZ temperature range of 2300-2500° F. In particular, no unstable flames occurred above an average NBZ temperature of 2500° F.

The results presented in Tables 1 and 2 indicate that NBZ temperature is strongly and repeatably dependent upon the rate of oxygen injection within the NBZ, in particular when compared to oxygen injection distributed along the length of the flame. The data also showed that NBZ flame temperature was a principal indicator of flame stability. It follows that a control system that utilizes a signal corresponding to NBZ temperature as a means for varying oxygen injection rate into the NBZ, as disclosed in our invention, provides an effective means for controlling flame stability.

TABLE 2

| Average NBZ Temperature Range (deg F.) | Frequency of Occurrence of Stable Flame | Frequency of Occurrence of Unstable Flame |
|---|---|---|
| 1800-1899 | 0.0% | 4.5% |
| 1900-1999 | 0.0% | 31.8% |
| 2000-2099 | 0.0% | 45.5% |
| 2100-2199 | 0.0% | 4.5% |
| 2200-2299 | 0.0% | 4.5% |
| 2300-2399 | 3.0% | 0.0% |
| 2400-2499 | 6.1% | 9.2% |
| 2500-2599 | 6.1% | 0.0% |
| 2600-2699 | 6.1% | 0.0% |
| 2700-2799 | 18.2% | 0.0% |
| 2800-2899 | 48.5% | 0.0% |
| 2900-2999 | 12.1% | 0.0% |
| Total | 100% | 100% |

Figure 8:
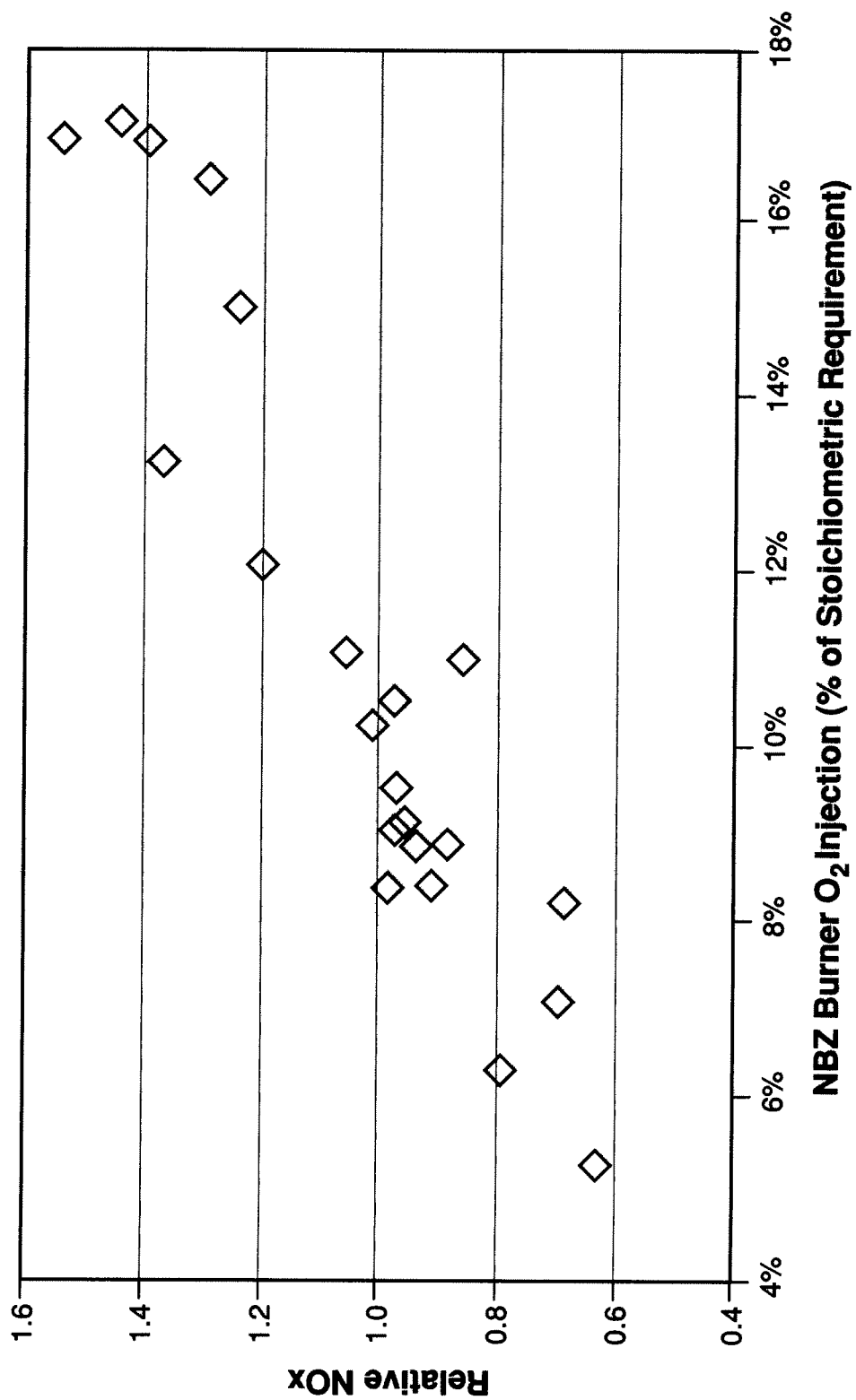
FIG. 8 shows a graph presenting NOx emissions plotted versus the NBZ oxygen injection rate.
Figure 9:
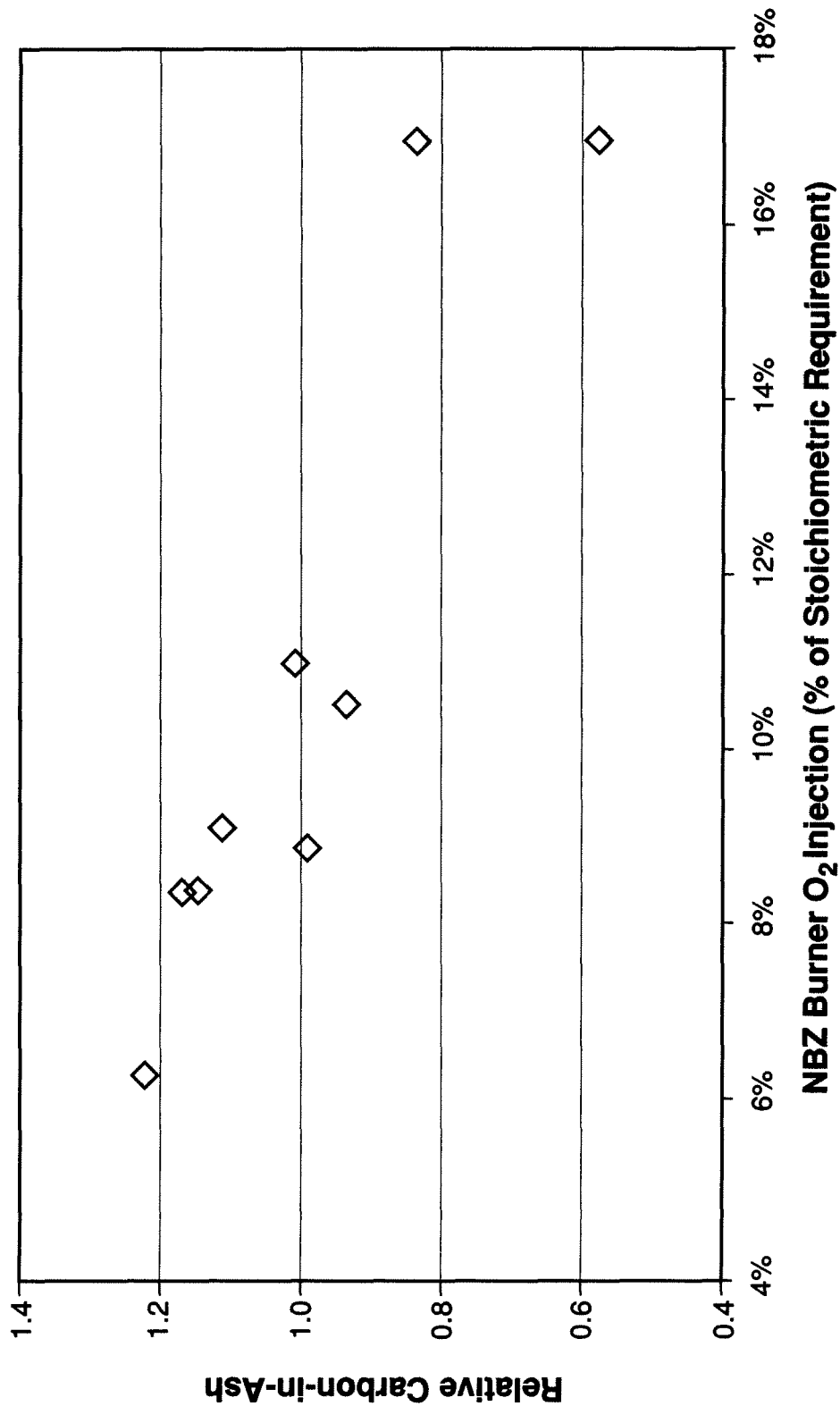
FIG. 9 shows a graph presenting carbon emissions plotted versus the NBZ oxygen injection rate.

In addition to its strong effect on flame stability, oxygen injection within the NBZ has been shown to be strongly related to the level of $NO_x$ emissions from a pulverized solid fuel flame. A relationship between $NO_x$ emissions and NBZ oxygen injection is presented is shown in FIG. 8, where relative $NO_x$ emissions is plotted versus the oxygen injection rate into the NBZ. The units on the injection rate are percent of the stoichiometric requirement. The $NO_x$ trend is the result of the variation in NBZ oxygen injection rate. A similarly strong effect exists between the NBZ oxygen injection rate and the level of unburned carbon-in-ash, as shown in FIG. 9. Hence, there is a substantial dependence of solid fuel combustion characteristics, beyond flame stability alone, on the rate of oxygen injection into the NBZ. The results of FIGS. 8 and 9 thereby illustrate the importance of employing feedback control of the NBZ oxygen injection rate for optimal burner and overall combustion system performance, while also suggesting that NBZ parameters other than temperature (eg. those that are more directly indicative of NOx or carbon burnout), including but not limited to measurements of chemical species or flame spectra, in particular ultraviolet, visible, infrared or acoustic spectra, may also be suitable for control purposes. The strong sensitivity of combustion characteristics on NBZ oxygen injection rate also suggest that large emissions, efficiency and stability penalties are potentially associated with oxygen injection rates that are non-optimized, not to mention the incremental costs associated with potentially utilizing too much oxygen. These considerations underscore the need to employ the type of feedback control disclosed herein, in particular when a multiplicity of burners are employed, in which case a non-automated control method would be extremely impractical.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for operating a combustion system burning solid fuel comprising:
   providing a burner system comprising at least one burner elements that are configured to combust solid fuel;
   providing more than one oxygen providing devices configured to introduce an oxygen rich stream, into the near burner zone of burner flames;
   providing a sensor arranged and disposed remote from the burner flames in order to measure a flame parameter in the near burner zone of the burner flame associated with the burner elements;
   measuring the flame parameter with the sensor;
   determining an oxygen rich stream flow in response to the measured flame parameter; and
   introducing the oxygen rich stream flow to one or more locations in the combustion system with the oxygen providing devices.

2. The method of claim 1, wherein the combustion system is a boiler or furnace.

3. The method of claim 1, wherein the solid fuel is at least about eighty percent petroleum coke.

4. The method of claim 1, wherein the flame parameter is a chemical species concentration or an acoustic emission.

5. The method of claim 1, wherein the flame parameter is an optical emission.

6. The method of claim 1, wherein the flame parameter is a temperature.

7. The method of claim 1, wherein the determining and introducing are repeated in a feedback loop.

8. The method of claim 1, wherein the introducing the oxygen rich stream flow to one or more locations in the combustion system includes one or more locations away from the near burner zone of one or more burner flames.

9. A combustion system comprising:
   a burner system having at least one burner elements configured to combust solid fuel;
   more than one oxygen providing devices configured to receive oxygen from an oxygen source and to introduce oxygen into the near burner zone of burner flames;
   a sensor arranged and disposed remote from the burner flames in order to measure a flame parameter in the near burner zone of the burner flame associated with the burner elements;
   a controller in communication with the sensor, the oxygen source and the oxygen providing devices; and
   wherein the controller is configured to receive signals from the sensor corresponding to the flame parameter, determine an oxygen flow in response to the flame parameter and provide the oxygen flow with the oxygen providing devices.

10. The system of claim 9, wherein the combustion system is a boiler or furnace.

11. The system of claim 9, wherein the flame parameter is an optical emission.

12. The system of claim 9, wherein the flame parameter is a temperature.

13. The system of claim 9, wherein the sensor is selected from the group consisting of one or more of an optical sensor, a chemical species sensor, a thermocouple, an acoustic sensor and combinations thereof.

14. The combustion system of claim 9 wherein the near burner zone extends from an outlet of the burner element a length of L wherein $L/D_B$ is less than or equal to about 5, and $D_B$ corresponds to the burner diameter.

15. The combustion system of claim 9 wherein the sensor is located in the combustion chamber.

16. The combustion system of claim 9 wherein the sensor is located exterior of the combustion chamber.

17. A boiler system comprising:
   a combustion chamber configured to receive combustion of a solid fuel;
   a combustion system comprising:
   a burner system comprising at least one burner elements configured to combust solid fuel;
   more than one oxygen providing devices configured to receive oxygen from an oxygen source, which produces an oxygen predominant stream, and to introduce oxygen into the near burner zone of flames;
   a sensor arranged and disposed remote from the burner flames in order to measure a flame parameter in the near burner zone of the burner flame associated with the burner elements;
   a controller in communication with the sensor and the oxygen providing devices; and
   wherein the controller is configured to receive signals from the sensor corresponding to the flame parameter, determine an oxygen flow in response to the flame parameter and provide the oxygen flow with the oxygen providing devices.

18. The system of claim 17, wherein the solid fuel is at least about eighty percent petroleum coke.

19. The system of claim 17, wherein the flame parameter is an optical emission.

20. The system of claim 17, wherein the flame parameter is a temperature.

21. The system of claim 17, wherein the sensor is selected from the group consisting of an optical sensor, a chemical species sensor, a thermocouple, an acoustic sensor and combinations thereof.

22. The system of claim 17, wherein the one or more oxygen providing devices include one or more devices for introducing oxygen away from the near burner zone of the one or more burner flames.

23. A method for operating a combustion system burning solid fuel comprising:
   providing a burner system comprising at least one burner element that is configured to combust solid fuel;
   providing at least one oxygen providing device configured to introduce an oxygen enriched stream into the near burner zone of burner flames;
   providing a sensor arranged and disposed remote from the burner flames in order to measure a flame parameter in the near burner zone of the burner flame associated with the at least one burner element;
   measuring the flame parameter with the sensor;
   determining an oxygen flow in response to the measured flame parameter; and
   introducing the oxygen enriched stream flew to one or more locations in the combustion system with the oxygen providing devices.

* * * * *